(12) United States Patent
Shanker

(10) Patent No.: US 6,794,059 B2
(45) Date of Patent: Sep. 21, 2004

(54) MULTILAYER THERMAL BARRIER COATINGS

(75) Inventor: Kartik Shanker, Winnipeg (CA)

(73) Assignee: Standard Aero Limited, Winnipeg (CA)

(*) Notice: Subject to any disclaimer, the term of this patent is extended or adjusted under 35 U.S.C. 154(b) by 0 days.

(21) Appl. No.: 10/258,452

(22) PCT Filed: Apr. 25, 2001

(86) PCT No.: PCT/CA01/00595
§ 371 (c)(1),
(2), (4) Date: Oct. 24, 2002

(87) PCT Pub. No.: WO01/83851
PCT Pub. Date: Nov. 8, 2001

(65) Prior Publication Data
US 2003/0138659 A1 Jul. 24, 2003

(30) Foreign Application Priority Data
Apr. 27, 2000 (CA) .............................................. 2306941

(51) Int. Cl.[7] ............................. B32B 15/04; F03B 3/12; C23C 2/00; C23C 4/00
(52) U.S. Cl. ..................... 428/633; 428/632; 428/701; 428/702; 428/697; 428/699; 428/336; 427/435; 427/453; 416/241 B
(58) Field of Search ................................ 428/632, 633, 428/469, 701, 702, 699, 697, 472, 336; 416/241 B; 427/585, 453, 454, 435

(56) References Cited

U.S. PATENT DOCUMENTS

| | | | |
|---|---|---|---|
| 4,328,285 A | 5/1982 | Siemers et al. |
| 5,384,200 A | 1/1995 | Giles et al. |
| 5,683,761 A | 11/1997 | Bruce et al. |
| 5,773,141 A | 6/1998 | Hasz et al. |
| 5,851,678 A | 12/1998 | Hasz et al. |
| 5,871,820 A | 2/1999 | Hasz et al. |
| 6,006,516 A | 12/1999 | Voss et al. |
| 6,203,927 B1 | * | 3/2001 | Subramanian et al. |
| 6,485,848 B1 | * | 11/2002 | Wang et al. |

FOREIGN PATENT DOCUMENTS

WO    WO96/31687    10/1996

* cited by examiner

Primary Examiner—Jennifer McNeil
(74) Attorney, Agent, or Firm—Aikins Patent Company; Murray E. Thrift

(57) ABSTRACT

The present invention relates to a thin impermeable top coat on a thermal barrier coating for a metal part, such as a turbine blade, wherein the composite thin top coat is porous, inert, non-sacrificial, less permeable ceramic layer that eliminates the infiltration of environmental contaminants into the thermal barrier coating during operation of the metal part, thereby extending the life of the underlying thermal barrier coating and metal part thereunder.

20 Claims, 1 Drawing Sheet

MULTILAYER THERMAL BARRIER COATINGS

FIELD OF THE INVENTION

The present invention relates to an article resistant to attack from environmental contaminants under high temperature conditions, the article being of the type comprising a metal alloy part, a thermal barrier coating deposited onto the metal alloy part, and a protective top coat of a material different from the material of the thermal barrier coating deposited onto the thermal barrier coating.

BACKGROUND OF THE INVENTION

Articles of this type are used, for example, as metal alloy parts in gas turbine engines operating under high temperature conditions. The thermal barrier coatings reduce the heat flow into the coated metal part during operation of the engine, and allow the metal part to run cooler than the gas stream, thereby extending part life and resulting in a higher combustion efficiency by permitting higher gas temperatures.

Conventional thermal barrier coatings are comprised of ceramic materials, for example chemically-stabilized zirconia, including yttria-stabilized zirconia (YSZ), scandia-stabilized zirconia, calcia-stabilized zirconia and magnesium zirconia, with YSZ being the thermal barrier coating of choice. These coatings are bonded to the surface of the metal part or to an intermediate metal bond coat.

A conventional thermal barrier coating is porous. It usually contains a degree of porosity ranging from 3–20%. The pores and any small micro-cracks also present in the material are not well-connected. Therefore, environmental contaminants do not have a ready path from the coating surface to the metal-ceramic interface. In use, these small micro-cracks lengthen and subsequently provide an easy, or more direct path for contaminants to reach the metal surface. The propagation and extension of micro-cracks is due to a combination of operating factors including, but not limited to, high temperature, high pressure, coating erosion by particulates, particle impact, chemical reactions and stress caused by differential thermal expansion. Some gases may also react with the thermal barrier coating to form molten salts that may effectively penetrate the micro-cracks and connected pores. Subsequent failure of the coating, which is also referred to as delamination or spalling, is a result of the corrosion of the metal at the metal-ceramic interface or within the ceramic layer adjacent to the metal.

The prior art describes certain techniques which aim to impede or reduce damage to the thermal barrier coatings, thus extending the service life of the protected metal parts.

There is a considerable body of information available regarding the numerous alternate methods of increasing thermal protection of the parent metal and/or extending the life of the ceramic coatings. This includes data in the open literature [Journal of Thermal Spray Technology, Journal of Engineering for Gas Turbines and Power, Engineered Materials Handbook Vol. 4 (Ceramics & Glasses) Section 11 (ASM International, 1991), etc.] and patent protected data. Coatings that consist of a metal bond layer with a single ceramic thermally insulating top coat have generally concentrated on improved oxidation resistant metal bond coats and more erosion, corrosion or thermal shock resistant ceramic coatings. The use of 8% yttria stabilized zirconia instead of 20% yttria stabilized zirconia and the development of ceria stabilized zirconia [Siemers et al., U.S. Pat. No. 4,328,285 (1982)] are typical examples. Bruce et al. U.S. Pat. No. 5,683,761 discloses the use (in certain applications) of pure alpha alumina, as a means of obtaining higher erosion resistance and lower density (than zirconia). Similarly, graded layers have been used, for improved thermal shock resistance. These approaches do not all have a single ceramic coating. Also, these coatings fail before failure of layers below them. They are "sacrificial" coatings.

Hasz el al. U.S. Pat. Nos. 5,871,820 issued on Feb. 16, 1999 and 5,851,678, issued on Dec. 22, 1998 describe a method for protecting a thermal barrier coating from environmental contaminants and a coating protected by the method. A top coat in the form of an impermeable, non-porous barrier coating is deposited onto the surface of the thermal barrier coating. This non-porous, impermeable barrier coating is intended to prevent the environmental contaminants from coming into contact with the ceramic thermal barrier coating.

U.S. Pat. No. 5,773,141 issued to Hasz et al. on Jun. 30, 1998 describes the provision of a top coat in the form of a single protective layer of a sacrificial or reactive oxide that overlays the outer surface of the thermal barrier coating. The sacrificial layer reacts with liquid contaminants to increase the viscosity or melting temperature of these contaminants. This inhibits chemical attack on the underlying thermal barrier. Since this protective layer reacts with the environment and is progressively depleted with continued use, it is said to be sacrificial, and will protect the thermal barrier coating for a limited period of time.

Bruce et al. U.S. Pat. No. 5,683,761 describes the use of pure alpha alumina as a top coat over zirconia ceramic coatings. The alpha alumina coating is used to increase erosion resistance and fails, by erosion or cracking, before the underlying zirconia coating is affected. That is, it is a sacrifical coating. Similarly, Voss et al. U.S. Pat. No. 6,006,516 describes the use of low porosity mullite over zirconia, to provide a chemically inert surface. This mullite coating must have lower porosity than the underlying zirconia, be smoother than the zirconia and fails before the underlying zirconia. Voss et al. describe the need for increased coating thickness for increased protection.

The present invention is concerned with the provision of thermal barrier coatings with increased resistance to attack by environmental contaminants at high temperature conditions.

SUMMARY OF THE INVENTION

In accordance with one aspect of the present invention, an article as described above is characterized in that:

the top coat is non-sacrificial;

the top coat is porous;

the top coat is substantially thinner than the thermal barrier coating;

the top coat is a material selected from the group consisting of ceria stabilized zirconia (CSZ); calcium-stabilized zirconia (CaSZ); zirconia toughened alumina (ZTA); a compound oxide other than mullite and modified mullite ceramics; and mixtures of two or more thereof; and the top coat is selected from materials more resistant to the environmental contaminants than the base thermal barrier coating.

It has been shown that the use of a top coat with these characteristics provides good protection for the thermal barrier coating. The top coat protects the thermal barrier coating in several ways, depending on the environmental contaminants and conditions present:

1. The protective top coat covers and encases the thermal barrier coating, providing a physical barrier on the surface of the thermal barrier coating and thereby substantially reducing the rate of infiltration of molten environmental contaminants into the thermal barrier coating.
2. The protective top coat provides a chemical barrier minimizing the chemical interaction of the contaminant environment with the thermal barrier coating, thereby significantly slowing down the chemical dissolution of the thermal barrier coating at high operating temperatures.
3. Since the top coat is selected not to react with environmental contaminants, adherence of these contaminants to the surface is resisted and the migration of these contaminants into the thermal barrier coating is accordingly minimised. In addition, most of the deposits that may form on the surface of the thin protective top coat are only loosely adhered to the surface and are quickly removed by the high velocity gas flowing over the surface, or during cool down owing to the consequent differential thermal expansion.
4. In environments where particulate impact or erosion may occur, a higher resistance in the thin protective top layer of the present invention reduces the rate of microcracking of the base ceramic layer, thereby extending the life of the coating.

For gas turbine applications of the invention, the metal alloy part, which may also be referred to as the parent material, may be of any material used in the construction of engine parts. The metal alloy part may, for example, comprise cobalt, iron, chromium, nickel, aluminum, or an alloy of two or more of those metals. When used, a metal bond coat may be comprised, for example, of a metal superalloy, or a metal alloy comprised of cobalt, iron, chromium, nickel, aluminum, or any other appropriate metal alloy material.

Compound oxides that may be used in the protective top coat may comprise two or more compounds from the group consisting of oxides of aluminum, cobalt, chromium, iron, titanium and nickel. The term "compound oxides" is to be construed as not including mullite, which is, in any case, specifically excluded by the foregoing description.

The protective thermal barrier coating may comprise yttria-stabilized zirconia (YSZ), alumina-titania, calcia stabilized-zirconia, magnesia stabilized-zirconia, ceria-stabilized zirconia (CSZ), scandia stabilized-zirconia, calcium silicate, calcium silicate zirconate blends, calcium-stabilized zirconia (CaSZ), zirconia toughened alumina (ZTA), alumina-zirconia, zirconium silicate, zircon, alumina or blends thereof.

The preferred ceramic of the thermal barrier coating is yttria-stabilized zirconia (YSZ) while the preferred protective top coat deposited thereon will depend on the specific environmental conditions faced.

Articles configured according to the present invention may be subjected to attack from various environmental contaminants. These may include oxygen, sodium, chlorine and saline mixtures, water vapour, vanadium, sulfur and similar contaminants under high temperature conditions. These contaminants may be carried by high velocity combustion gas streams at temperatures from 850° C. (1560° F.) to 1200° C. (2204° F.) or higher. The parts may be subjected to continuous, long term exposure or thermally cycled exposure.

Both the base ceramic layer and the top protective layer may be deposited by thermal spraying (plasma or flame) or from a slurry or by sol-gel techniques. When deposited from a slurry or sol-gel, a subsequent heat treatment will be required to dry the coating and provide the necessary cohesive and adhesive strength.

Where the top coat comprises compound oxides, those oxides may include two or more compounds from the group consisting of oxides of aluminum, cobalt, chromium, iron titanium and nickel. A compound oxide top coat is preferably deposited by plasma or flame thermal spray processes, however, slurry and sol-gel techniques may be used as well, with a subsequent heat treatment.

The top coat is a porous but continuous layer, of thickness between 25 and 125 microns (0.001 and 0.005 inches), and porosity between 1 and 20%. Preferably, the top coat will be 25–50 microns (0.001–0.002 inches) thick with 3–10% pore content. Lower pore content than the underlying ceramic coating is not necessary.

The reduction or prevention of contaminants into the thermal barrier coating reduces the occurrence of fracture at or near the thermal barrier coating-metal interface, which may also be referred to as the ceramic-metal interface. The reduction and prevention of the infiltration of contaminants into the ceramic layer of the thermal barrier coating and the subsequent infiltration of contaminants to or near to the ceramic-metal interface reduces the occurrence of delamination, prevents failure of the thermal barrier coating and consequently maintains the integrity of the thermal barrier coating and extends the life of the metal alloy part.

It should be noted that the properties of the protective top coat materials are not all identical. The selection of which protective top coat will be deposited onto the thermal barrier coating should be based on the specific needs and use requirements of the metal alloy part. For example, at temperatures less than 1000° C. (1832° F.) a protective top coat of calcium silicate zirconate (CaSZ) or compound oxides may provide better protection than a protective top coat of ceria-stabilized zirconia (CSZ) or zirconia toughened alumina (ZTA), whereas the reverse may be true at temperatures exceeding 1000° C. (1832° F.).

The present protective top coat is useful in preserving the thermal barrier coating from the contaminant environments of operating gas turbines. However, the utility of the top coat is not limited to that operating environment. It is also suitable for hot section gas turbine parts as well as other machine parts, which may encounter high operating temperatures or undergo thermal cycling. For example, the present protective coating may serve as a useful protective coating in a variety of industrial fields, such as steam engines, boilers, standard air engines, marine atmospheres, petrochemical and metal refineries.

The thickness of the protective top coat may vary, but the preferred thickness is essentially determined by the amount of protective coating needed to prevent the infiltration of environmental contaminants into the thermal barrier coat. The protective top coat of the present invention is thin with respect to the ceramic layer of the thermal barrier coating it encases. The thickness of the protective top coat may be approximately one fifth the thickness of the ceramic layer of the thermal barrier coating thereunder. Preferably the thickness of the top coat is in the range from approximately 25 to 125 microns (0.001–0.005 inches) with 25–50 microns (0.001–0.002 inches) being the generally desirable range, whereas the thickness of the thermal barrier coating may be in the range of approximately 75 to 500 microns (0.003–0.020 inches).

A thicker protective top coat does not necessarily extend the life of the thermal barrier coating. For example, an increased total ceramic thickness, that is the thickness of the ceramic protective top coat and the thickness of the thermal barrier coating may contribute to an increased sensitivity to thermal spalling, or a restriction in the proper flow of the combustion gases. In general the thicker the top coat, the more susceptible it is to failure due to fracture at the ceramic-metal interface or delamination under thermal cycling.

In certain operating conditions, which may involve particular temperature combinations or temperature and corrosive combinations, a thicker protective top coat may be useful. These conditions are more likely to occur in some industrial manufacturing conditions rather than in gas turbine operating environments. It should be noted that, if a thicker protective layer according to the present invention is required, the top coat and the thermal barrier coating may be graded to minimize internal stresses.

The thermal barrier coating may comprise yttria-stabilized zirconia (YSZ), alumina-titania, calcia stabilized-zirconia, magnesia stabilized-zirconia, ceria-stabilized zirconia (CSZ), scandia stabilized-zirconia, calcium silicate, calcium silicate zirconate blends, calcium-stabilized zirconia (CaSZ), zirconia toughened alumina (ZTA), alumina-zirconia, zirconium silicate, zircon, alumina or blends thereof, wherein YSZ is a preferred ceramic coat. In addition to its superior thermal insulating ability, YSZ also exhibits excellent adhesion properties under thermal cycling conditions.

BRIEF DESCRIPTION OF THE DRAWINGS

In the accompanying drawings, which illustrate experimental test samples after exposure to simulated operating conditions.

DETAILED DESCRIPTION OF EXAMPLES

Figure 1:
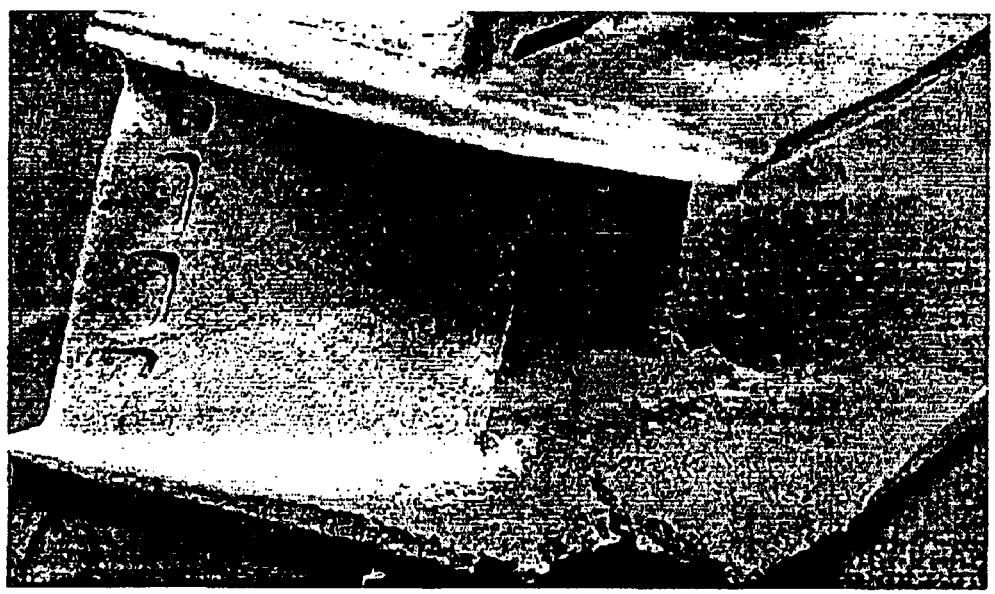
FIG. 1 is a photograph of a turbine blade processed according to Example V.

The following Examples illustrate the benefits of the protective layer of the present invention.

EXAMPLE I

Superalloy pins of one group were air plasma coated with 500 microns (0.012 inch) thick of yttria-stabilized zirconia (YSZ) while superalloy pins of another group were coated with 500 microns (0.012 inch) thick zirconia toughened alumina (ZTA). Some of the YSZ coated pins were further air plasma coated with a thin layer of ZTA or ceria-stabilized zirconia (CSZ), with the additional coat being less than 50 microns (0.002 inch) thick. The YSZ, ZTA, YSZ-ZTA and YSZ-CSZ superalloy pins were then subjected to thermal cycling in air, using a natural gas burner, to a maximum temperature of 1232° C. (2250° F.). The pins then underwent a controlled rapid cooling to less than 204° C. (400° F.) with dry compressed air. The YSZ and the ZTA coated pins failed after 504 and 433 cycles, respectively, while the pins coated with YSZ-ZTA and with YSZ-CSZ did not fail, even after 600 cycles. This result illustrates the effectiveness of the thin top layer in increasing the spalling or dissolution resistance of the coating material. Moreover, the present Example illustrates that single layer ceramic coats do not last as long as base ceramic coats that have been coated with a thin top layer, irrespective of the base ceramic coat composition, thereby further demonstrating that the thin top coat of the present invention increases the life of the base ceramic coat and therefore, as a result, provides thermal insulation for a prolonged period of time.

EXAMPLE II

Superalloy pins were air plasma coated with 75–150 micron (0.003–0.006 inch) thick of yttria-stabilized zirconia (YSZ). Some of the YSZ coated pins were further air plasma coated with a 50–75 micron (0.002–0.003 inch) thick layer of CSZ or calcium silicate zirconate (CaSZ), thereby yielding pins coated with YSZ-CSZ or YSZ-CaSZ, respectively. The YSZ, YSZ—CSZ and YSZ—CaSZ coated pins were then subjected to thermal cycling in air, using a natural gas burner, to a maximum temperature of 1232° C. (2250° F.). The pins then underwent a controlled rapid cooling to less than 204° C. (400° F.) with dry compressed air. The pins were then sprayed with a water-based solution of 3% sulfur, 3% sodium and 1% vanadium. Upon examination, the pins without the protective top coat, i.e. the YSZ coated pins failed after 130–150 cycles, while the coated pins, i.e. the YSZ—CSZ and YSZ—CaSZ pins did not fail even after over 200 cycles. It was further noted that, for both the YSZ—CSZ and YSZ—CaSZ coated pins, the top coat did not fail, failure only occurred when the lower YSZ coat fractured away from the base metal coat at the interface between the metal pin and the adjacent YSZ coat. The thin top coat deposited onto the lower YSZ coat did not fail, and remained intact, i.e. the CSZ and CaSZ did not fragment or fracture off the lower YSZ coat. The results of this Example illustrate the protection provided by the thin top coat layer to the thermal cycling process in a salt environment, whereby the protective top coat was non-sacrificial, that is to say, it did not deplete or dissolve during the cycling process. The protective top coat did not fail, and the loss of thermal protection to the underlying superalloy pins only occurred when the lower coat finally failed.

EXAMPLE III

Superalloy pins were air plasma coated with ceramic coatings to a total thickness of about 150 microns (0.006 inch). Three coating types included pins coated with 150 microns (0.006 inch) YSZ only, pins coated with 75–100 microns (0.002–0.004 inch) YSZ plus 50 microns (0.002 inch) CSZ, and pins coated with 75–100 microns (0.003–0.004 inch) YSZ plus 50 microns (0.002 inch) CaSZ, respectively. The YSZ, YSZ-CSZ and YSZ-CaSZ coated pins were then subjected to 53 thermal cycles in air, using a natural gas burner, to a maximum temperature of 1150° C. (2100° F.). The pins then underwent a controlled rapid cooling to less than 204° C. (400° F.) with dry compressed air, during which time the pins were sprayed with a water-based solution of 0.5% sulfur, 0.77% chlorine and 0.86% sodium. After these 53 cycles, the thermal cycling conditions were changed to 1177° C. (2150° F.) max temperature, less than 204° C. (400° F.) cold temperature, one extra minute of exposure at max temperature, and sprayed with an aqueous solution of 1% vanadium, 3% sulfur and 3% sodium. The single layer YSZ coating failed first; at as low as 53 cycles and at an average of 101 cycles, while the coatings containing a top protective layer did not fail even after 130 cycles. The results of this Example shows that the total ceramic coating thickness is not a major factor in the protection provided by the top ceramic layer. All the coatings in this Example had the same total ceramic thickness.

EXAMPLE IV

Superalloy pins were air plasma coated with ceramic coatings as follows: 300 microns (0.012") thick YSZ, 300 microns (0.012") thick YSZ plus 25 microns (0.001") thick ZTA, 300 microns (0.012") thick YSZ plus 25 microns (0.001") thick CSZ, 300 microns (0.012") thick ZTA, and 300 microns (0.012") thick ZTA plus 25 microns (0.001") thick CSZ. These YSZ, YSZ—ZTA, YSZ—CSZ, ZTA and ZTA—CSZ pins were subject to thermal cycles in air using a natural gas burner, to a maximum temperature of 1204–1232° C. (2200–2250° F.), followed by rapid air cooling below 204° C. (400° F.). The single layer YSZ and ZTA coatings cracked after 504 and 433 cycles, respectively, while the two-layer coatings performed as follows: YSZ—ZTA=cracked after 934 cycles, YSZ—CSZ=cracked after 934 cycles, and ZTA—CSZ=no cracks after 433 cycles. These results demonstrate that the very thin second ceramic layer extends the life of the base ceramic coating significantly, independent of the base ceramic composition (but within the claimed group of materials). Also, the delamination of the two layer ceramic coatings occurred at or near the base ceramic—metal interface, before failure of the top ceramic layer.

EXAMPLE V

The airfoils of a set of superalloy turbine vanes were air plasma coated with two layers of ceramic: 50–375 microns (0.002–0.015") thick YSZ with a top coat of 25–50 microns (0.001–0.002") thick CSZ. The thickness of the ceramic varied from location to location on the airfoils. The vanes were thermally cycled for 1300 cycles using a Jet A kerosene fuel burner (heating) and compressed air (cooling). Each cycle consisted of 3 minutes heating [$T_{max}$=1065–1093° C. (1950–2000° F.)] and 3 min. cooling [$T_{min}$=<150° C. (300° F.)]. There was very slight damage to the ceramic coatings on completion of the test, as seen in FIG. 1, demonstrating that the ceramic coating combination was able to withstand the severe thermal cycling stresses in a combustion gas environment containing contaminants present in jet fuel. The minor damage to ceramic coating may be compared to the severe damage to the platform. Previously, tests had been conducted on single layer YSZ ceramic coated turbine vanes, coated by several different sources, on the same burner rig and using identical thermal cycling conditions. In all those cases, the single layer ceramic coating delaminated over a very wide surface area. In some of those tests, delamination was observed at as few as 100 cycles. The results of this example demonstrate the significant increase in service life obtainable with a very thin second ceramic coating.

EXAMPLE VI

Figure 2:
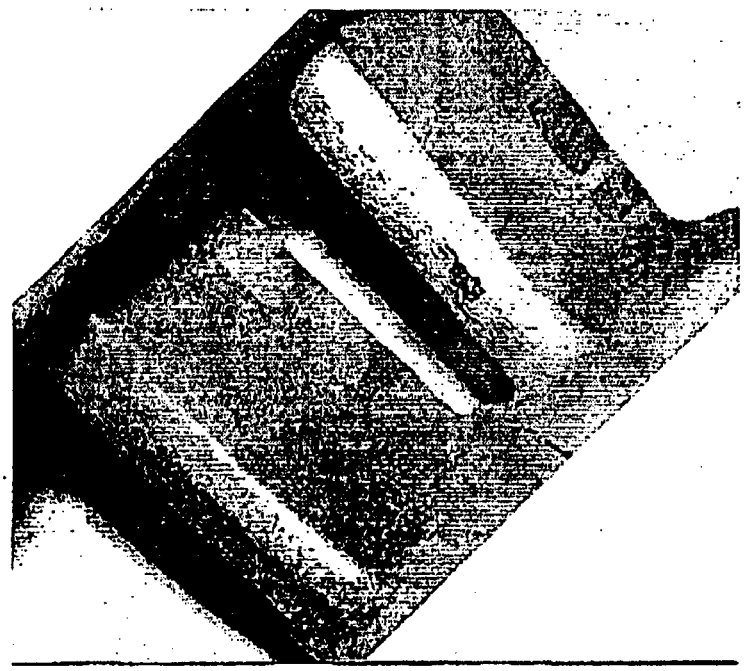
FIG. 2 is a photograph of a turbine blade processed according to Example VI.

Two layer ceramic coated turbine vanes were thermally cycled in burner rig. The turbine vanes, ceramic coatings and thermal cycling conditions were identical to those in Example V, except that natural gas was the fuel instead of Jet A kerosene. After 1340 cycles, 40 more than in Example V, one of the airfoils had a small (<5 mm²) delaminated area on the leading edge, FIG. 2. The rest of the coating showed no damage. Cross-sectional examination of this delaminated area showed that failure occurred near the YSZ—metal interface and not in or near the top CSZ layer. This example demonstrates that failure of the ceramic occurs by failure in the bottom layer before damage to, or consumption of, the top ceramic layer. The thin second layer extends life of the base ceramic coating, but does not fail first.

The above Examples illustrate that the thin protective top coat according to the present invention improves the life of the lower thermal barrier coat. In addition, the protective coat of the present invention is non-sacrificial and does not fail with repeated use. The protective top coat only failed when the lower thermal barrier coat failed.

While preferred embodiments have been described, it will be understood that there is no intent to limit the invention to such disclosure, but rather it is intended to cover all modifications and alternate applications falling within the spirit and scope of the invention.

What is claimed is:

1. An article resistant to attack from environmental contaminants under high temperature conditions, the article being of the type comprising a metal alloy part, a thermal barrier coating deposited onto the metal alloy part, and a protective top coat of a material different from the material of the thermal barrier coating deposited onto the thermal barrier coating, characterized in that:

the top coat is non-sacrificial;
the top coat is porous;
the top coat is substantially thinner than the thermal barrier coating;
the top coat is a material selected from the group consisting of carts stabilized zirconia (CSZ); calcium-stabilized zirconia (CaSZ); zirconia toughened alumina (ZTA); a compound oxide comprising two or more compounds from the group consisting of oxides of aluminum, cobalt, chromium, iron, titanium and nickel and mixtures of two or more thereof; and
the top coat is selected from materials more resistant to the environmental contaminants than the thermal barrier coating.

2. An article according to claim 1, wherein the protective top coat has a thickness of from 25 to 125 microns (0.001–0.005 inches).

3. An article according to claim 1, wherein the protective top coat has a porosity of from 1 to 20% by volume.

4. An article according to claim 1, wherein the protective top coat has a porosity of from 3 to 20% by volume.

5. An article according to claim 1, wherein the protective top coat is substantially inert to the environmental contaminants, such that the protective top coat does not chemically or physically deplete with repeated use.

6. An article according to claim 1, wherein the thermal barrier coating has a thickness of from 75 to 500 microns (0.003–0.012 inch).

7. An article according to claim 1, wherein the thickness of the thermal barrier coating is approximately five times the thickness of the top coat.

8. An article according to claim 1 wherein the top coat has a degree of porosity ranging from 1–20% by volume;.

9. An article according to claim 1, wherein the article is resistant to attack from environmental contaminants comprising oxygen, sodium, chlorine, saline mixtures, water vapour, sodium, vanadium, sulfur and similar contaminants under high temperature and/or high pressure conditions.

10. An article according to claim 8, wherein said metal alloy part comprises cobalt, iron, chromium, nickel, aluminum, or an alloy of two or more thereof.

11. An article according to claim 1, wherein said protective thermal barrier coating comprises a base ceramic coating and an inner metal alloy bond coat, with the inner metal alloy bond coat deposited onto the metal alloy part and the base ceramic coating deposited onto the inner metal alloy bond coat.

12. An article according to claim 11, wherein the metal bond coat comprises a superalloy.

13. An article according to claim 11, wherein the metal bond coat comprises an alloy including one or more of cobalt, iron, chromium, nickel and aluminum.

14. An article according to claim 11, wherein the protective thermal barrier coating comprises a base ceramic coating, and the base ceramic coating is deposited onto the metal alloy part and the ceramic top coat is deposited onto the inner metal alloy bond coat.

15. An article according to claim 11, wherein the base ceramic coating of the protective thermal barrier coating comprises yttria-stabilized zirconia (YSZ), alumina-titania, calcia stabilized-zirconia, magnesia stabilized-zirconia, ceria stabilized zirconia (CSZ), scandia stabilized-zirconia, calcium silicate, calcium silicate zirconate blends, calcium-stabilized zirconia (CaSZ), zirconia toughened alumina (ZTA), alumina-zirconia, zirconium silicate, zircon, alumina or a blend thereof.

16. An article according to claim 1, wherein the protective thermal barrier coating comprises a base ceramic coating, and the base ceramic coating is deposited onto the metal alloy part and the ceramic top coat is deposited onto the base ceramic coating.

17. A method of deposition of an article according to claim 1, wherein said protective top coat or said outer base ceramic coat is applied by thermal plasma spraying or flame spraying, slurry, cold spraying or a sol-gel technique.

18. A method of deposition according to claim 17, wherein the protective top coat or said outer base ceramic coat is thermally sprayed with air or atmospheric plasma.

19. A method of deposition according to claim 18, wherein the protective top coat or said outer base ceramic coat is applied by means of brushing, dipping, or spraying to achieve a substantially uniform coating layer.

20. A method of deposition according to claim 18, wherein subsequent to the deposition of said protective top coat or said outer base ceramic coat, thermal treatment is effected to enhance the adhesion of the deposited coating layer to the ceramic layer or article thereunder.

* * * * *